United States Patent
Chen et al.

(10) Patent No.: US 10,950,256 B2
(45) Date of Patent: Mar. 16, 2021

(54) SYSTEM AND METHOD FOR TEXT-TO-SPEECH PERFORMANCE EVALUATION

(71) Applicant: Bayerische Motoren Werke Aktiengesellschaft, Munich (DE)

(72) Inventors: Lu Chen, Shanghai (CN); Carsten Isert, Munich (DE); Sam Lai, Shanghai (CN); Wenhui Lei, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 149 days.

(21) Appl. No.: 16/373,788

(22) Filed: Apr. 3, 2019

(65) Prior Publication Data

US 2019/0228793 A1      Jul. 25, 2019

Related U.S. Application Data

(63) Continuation of application No. PCT/CN2016/104438, filed on Nov. 3, 2016.

(51) Int. Cl.
G10L 25/69      (2013.01)
G06N 20/00      (2019.01)
G10L 13/047     (2013.01)
G10L 25/27      (2013.01)

(52) U.S. Cl.
CPC .............. G10L 25/69 (2013.01); G06N 20/00 (2019.01); G10L 13/047 (2013.01); G10L 25/27 (2013.01)

(58) Field of Classification Search
CPC .............................. G10L 25/69; G10L 13/047
See application file for complete search history.

(56) References Cited

U.S. PATENT DOCUMENTS 8,271,408 B2 *   9/2012   Sellamanickam .... G06F 16/353
                                                        706/12
8,510,113 B1 *   8/2013   Conkie .................. G10L 13/02
                                                        704/258

(Continued)

FOREIGN PATENT DOCUMENTS

CN      104485115 A     4/2015
CN      104505103 A     4/2015

(Continued)

OTHER PUBLICATIONS

International Search Report (PCT/ISA/210) issued in PCT Application No. PCT/CN2016/104438 dated Aug. 3, 2017 (five (5) pages).

(Continued)

*Primary Examiner* — Shaun Roberts
(74) *Attorney, Agent, or Firm* — Crowell & Moring LLP

(57) ABSTRACT

A system and method for text-to-speech performance evaluation are provided. The method (100) for text-to-speech performance evaluation includes providing a plurality of speech samples and scores associated with the respective speech samples (110); extracting acoustic features that influence the associated scores of the respective speech samples from the respective speech samples (120); training a machine learning model by the acoustic features and corresponding scores (130); and evaluating a text-to-speech engine by the trained machine learning model (140).

17 Claims, 5 Drawing Sheets

(56) References Cited

U.S. PATENT DOCUMENTS

| | | | |
|---|---|---|---|
| 8,527,276 B1* | 9/2013 | Senior | G06N 3/084 |
| | | | 704/259 |
| 2003/0083859 A1* | 5/2003 | Murata | G06F 40/20 |
| | | | 704/1 |
| 2005/0060155 A1* | 3/2005 | Chu | G10L 13/00 |
| | | | 704/269 |
| 2007/0239632 A1 | 10/2007 | Burges et al. | |
| 2008/0172234 A1 | 7/2008 | Eide et al. | |
| 2011/0016065 A1* | 1/2011 | Chapelle | G06N 20/00 |
| | | | 706/12 |
| 2011/0313762 A1* | 12/2011 | Ben-David | G10L 13/08 |
| | | | 704/231 |
| 2012/0035917 A1* | 2/2012 | Kim | G10L 15/1807 |
| | | | 704/200.1 |
| 2013/0080172 A1* | 3/2013 | Talwar | G10L 25/69 |
| | | | 704/260 |
| 2013/0080173 A1* | 3/2013 | Talwar | G10L 13/033 |
| | | | 704/260 |
| 2014/0025381 A1* | 1/2014 | Wang | G10L 13/00 |
| | | | 704/260 |
| 2014/0058731 A1* | 2/2014 | Tyagi | G10L 15/063 |
| | | | 704/243 |
| 2014/0122081 A1* | 5/2014 | Kaszczuk | G10L 13/08 |
| | | | 704/260 |
| 2014/0257815 A1 | 9/2014 | Zhao et al. | |
| 2016/0240215 A1 | 8/2016 | Suess et al. | |

FOREIGN PATENT DOCUMENTS

| | | |
|---|---|---|
| CN | 105103221 A | 11/2015 |
| CN | 105593936 A | 5/2016 |
| GB | 2 423 903 A | 9/2006 |

OTHER PUBLICATIONS

Written Opinion (PCT/ISA/237) issued in PCT Application No. PCT/CN2016/104438 dated Aug. 3, 2017 (four (4) pages).

Guyon et al., "An Introduction to Variable and Feature Selection," Journal of Machine Learning Research, vol. 3, 2003, pp. 1157-1182 (26 pages).

* cited by examiner

SYSTEM AND METHOD FOR TEXT-TO-SPEECH PERFORMANCE EVALUATION

CROSS REFERENCE TO RELATED APPLICATION

This application is a continuation of PCT International Application No. PCT/CN2016/104438, filed Nov. 3, 2016, the entire disclosure of which is herein expressly incorporated by reference.

BACKGROUND AND SUMMARY OF THE INVENTION

The present invention relates in general to the field of text-to-speech (TTS) synthesis, and in more particular, to a system and associated method for performance evaluation of TTS synthesis.

A voice assistant system has become more and more popular as a modern in-vehicle electronic apparatus. Text-To-Speech (TTS) is a very important component of it, whose quality is highly important to the usage scenario and users' feeling. Currently, the most popular evaluation method to measure the TTS system quality is Mean Opinion Score (MOS), which asks common evaluators to give 5 different ratings by listening to the speech samples from different TTS systems, for which evaluators measure the quality from 3 aspects: Pronunciation, Naturalness and overall Impression. The details are shown below in Table 1. The average from different evaluators and aspects is the final overall score of a speech sample, and simply the average of all speech samples of a particular TTS system is the score of the TTS system, or based on a specific application purpose, the average from different evaluators and only one aspect, such as naturalness is used as the score of a TTS system.

TABLE 1

MOS measurement

| | | |
|---|---|---|
| Pronunciation | Did you notice anomalies in pronunciation? | 5: No<br>4: Yes, but not annoying<br>3: Yes, slightly annoying<br>2: Yes, annoying<br>1: Yes, very annoying |
| Naturalness | How would you rate the naturalness of the utterance? | 5: Very Natural<br>4: Natural<br>3: Neutral<br>2: Unnatural<br>1: Very Unnatural |
| Overall Impression | How do you rate the overall quality of this sample? | 5: The overall quality is Excellent<br>4: The overall quality is Good<br>3: The overall quality is Fair<br>2: The overall quality is Poor<br>1: The overall quality is Very Poor |

Besides the above subjective method, there are some objective methods. One idea is to collect natural speech samples from the same speaker which is used for the synthesis inventory, and a perceptually weighted distance between the synthesized and the naturally-produced samples of this speaker can then be used as an index of the quality degradation. Another idea proposed to extract perception-based features, such as Mel Frequency Cepstrum Coefficients (MFCCs) from the synthesized speech material and to compare them to features extracted from (other) natural speakers. A German team analyzed the perceptual quality dimensions of TTS system, and proved naturalness, disturbances and temporal distortions to be the 3 most significant dimensions and naturalness to be the most important one.

For the subjective method, it is time-consuming, expensive and a labor-intensive work, and the score highly depends on the perceiving and judging of the evaluators, but these two points are easily affected by the attitude, mentality and preference when listening to the speech samples. In order to overcome the shortness, the organizer should prepare well, keeping a quiet space, using a high quality speaker, hiring and training at least 10 listeners each time and so on. Another drawback is that its generalization is almost zero, so when you want evaluate a new system, you should repeat all previous work, because even if you have tested tens of other systems, the MOS scores and the experience are almost useless.

Considering the principles of other objective methods, the main shortcoming is that there is no suitable natural speech as a reference to evaluate TTS systems. On the other hand, speech quality depends more on high-layer characteristics (such as naturalness, intonation and rhyme) rather than bottom-layer acoustic features, but it is really difficult to extract the high-layer characteristics. Another important concept is that the performance of synthesized speech is composed of different factors, and different factors have different influences. Part of this concept has been proved by the German team in that naturalness is the most important one. So it is improper to use the bottom-layer features directly, which is a mixture that contains too many factors.

SUMMARY

An aspect of the present invention is to provide a system and method for text-to-speech performance evaluation that can address one or more of the above and other prior art problems.

In an aspect of the claimed invention, a method for text-to-speech (TTS) performance evaluation is provided. The method may comprise: providing a plurality of speech samples and scores associated with the respective speech samples; extracting acoustic features that influence the associated scores of the respective speech samples from the respective speech samples; training a machine learning model by the acoustic features and corresponding scores; and evaluating a text-to-speech engine by the trained machine learning model.

In an example of the present embodiment, extracting acoustic features that influence the associated scores of the respective speech samples from the respective speech samples comprises: extracting a set of acoustic features from the respective speech samples; and selecting the acoustic features that influence the associated scores of the respective speech samples from the set of acoustic features according to relevancy between each acoustic feature in the extracted set of acoustic features and the associated score of the respective speech sample.

In an example of the present embodiment, selecting the acoustic features that influence the associated scores of the respective speech samples from the set of extracted acoustic features further comprises: applying a sub-space decomposition method to the selected acoustic features.

In an example of the present embodiment, applying the sub-space decomposition method comprises applying a Linear Discriminant Analysis (LDA).

In an example of the present embodiment, the machine learning model comprises one of a vector support regression (SVR) model, a Deep Neural Networks (DNN) model, and a ListNet model.

In an example of the present embodiment, the machine learning model is a pairwise support vector machine (SVM) model, and training the machine learning model by the acoustic features and corresponding scores comprises: combining a vector representing the acoustic features of a first speech sample and a vector representing the acoustic features of a second speech sample, wherein the first speech sample and the second speech sample are samples with the same textual content but from different speech sources; and training a SVM model with the combined vector and a label representing the relative size of the associated score of the first speech sample and the second speech sample.

In an example of the present embodiment, if the associated score of the first speech sample is larger than that of the second speech sample, the label is set to 1, otherwise, the label is set to 0.

In an example of the present embodiment, combining a vector representing the acoustic features of a first speech sample and a vector representing the acoustic features of a second speech sample comprises one of: joining the vector representing the acoustic features of the first speech sample and the vector representing the acoustic features of the second speech sample; or subtracting the vector representing the acoustic features of the second speech sample from the vector representing the acoustic features of the first speech sample.

In an example of the present embodiment, providing the plurality of speech samples and scores further comprises: recording the plurality of speech samples from a plurality of speech sources including text-to-speech engines and human beings based on a same set of training text; and rating each of the plurality of speech samples to assign the score thereto.

In an example of the present embodiment, evaluating the text-to-speech engine further comprises: providing a set of test text to the text-to-speech engine under evaluation; receiving speeches converted by the text-to-speech engine under evaluation from the set of test text; and computing a score for each piece of speeches based on the trained machine learning model.

In another aspect of the claimed invention, a system for text-to-speech performance evaluation is provided. The system may comprise: a sample store containing a plurality of speech samples and scores associated with the respective speech samples; an acoustic feature extracting section configured to extract acoustic features that influence the associated scores of the respective speech samples from the respective speech samples; a model training section configured to train a machine learning model by the acoustic features and corresponding scores; and an evaluating section configured to evaluate a text-to-speech engine by the trained machine learning model.

In an example of the present embodiment, to extract acoustic features that influence the associated scores of the respective speech samples from the respective speech samples, the acoustic feature extracting section is configured to: extract a set of acoustic features from the respective speech samples; and select the acoustic features that influence the associated scores of the respective speech samples from the set of acoustic features according to relevancy between each acoustic feature in the extracted set of acoustic features and the associated score of the respective speech sample.

In an example of the present embodiment, to select the acoustic features that influence the associated scores of the respective speech samples from the set of extracted acoustic features, the acoustic feature extracting section is further configured to: apply a sub-space decomposition method to the selected acoustic features.

In an example of the present embodiment, apply the sub-space decomposition method comprises applying a Linear Discriminant Analysis (LDA).

In an example of the present embodiment, the machine learning model is a pairwise support vector machine (SVM) model, and to train the machine learning model by the acoustic features and corresponding scores, the model training section is configured to: combine a vector representing the acoustic features of a first speech sample and a vector representing the acoustic features of a second speech sample, wherein the first speech sample and the second speech sample are samples with the same textual content but from different speech sources; and train a SVM model with the combined vector and a label representing the relative size of the associated score of the first speech sample and the second speech sample.

In an example of the present embodiment, to combine a vector representing the acoustic features of a first speech sample and a vector representing the acoustic features of a second speech sample, the model training section is configured to implement one of: join the vector representing the acoustic features of the first speech sample and the vector representing the acoustic features of the second speech sample; or subtract the vector representing the acoustic features of the second speech sample from the vector representing the acoustic features of the first speech sample.

In an example of the present embodiment, if the associated score of the first speech sample is larger than that of the second speech sample, the label is set to 1, otherwise, the label is set to 0.

In an example of the present embodiment, the evaluation section further comprises: a test text store configured to provide a set of test text to the text-to-speech engine under evaluation; a speech store configured to receive speeches converted by the text-to-speech engine under evaluation from the set of test text; and a computing unit configured to compute computing a score for each piece of speeches based on the trained machine learning model.

In yet another aspect of the claimed invention, a vehicle equipped with a system for text-to-speech performance evaluation is provided. The system may comprise: a sample store containing a plurality of speech samples and scores associated with the respective speech samples; an acoustic feature extracting section configured to extract acoustic features that influence the associated scores of the respective speech samples from the respective speech samples; a model training section configured to train a machine learning model by the acoustic features and corresponding scores; and an evaluating section configured to evaluate a text-to-speech engine by the trained machine learning model.

In an example of the present embodiment, the machine learning model is a pairwise support vector machine (SVM) model, and to train the machine learning model by the acoustic features and corresponding scores, the model training section is configured to: combine a vector representing the acoustic features of a first speech sample and a vector representing the acoustic features of a second speech sample, wherein the first speech sample and the second speech sample are samples with the same textual content but from different speech sources; and train a SVM model with the combined vector and a label representing the relative size of the associated score of the first speech sample and the second speech sample.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

Other objects, advantages and novel features of the present invention will become apparent from the following detailed description of one or more preferred embodiments when considered in conjunction with the accompanying drawings.

BRIEF DESCRIPTION OF THE DRAWINGS

The above and other aspects and advantages of the present invention will become apparent from the following detailed description of exemplary embodiments taken in conjunction with the accompanying drawings which illustrate, by way of example, the principles of the invention.

DETAILED DESCRIPTION OF THE DRAWINGS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present invention.

A general idea of the present invention is to solve the problem of automatic TTS evaluation by a supervised machine learning approach combining several aspects. This includes the following phases: generating a data set from different TTS systems and manually labelling it for evaluation, extracting quality related features from the data set, using the quality related features and corresponding scores to train a machine learning model and utilize the trained machine learning model to complete the evaluation task.

Figure 1:
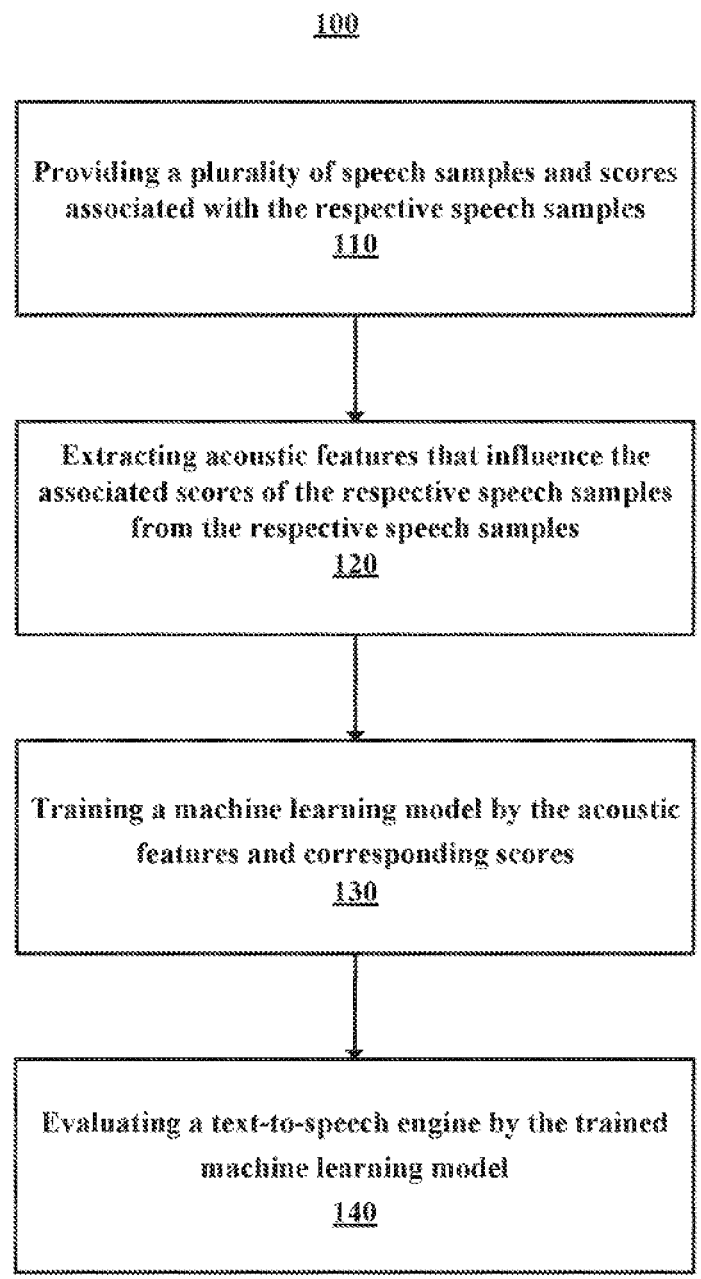
FIG. 1 illustrates a high level flow chart showing a method for text-to-speech performance evaluation in accordance with an exemplary embodiment of the present invention.

Referring first to FIG. 1, there is shown a high level flow chart of a method 100 for text-to-speech performance evaluation in accordance with an exemplary embodiment of the present invention.

At step 110, a plurality of speech samples and scores associated with the respective speech samples are provided. In an example of the present embodiment, providing the plurality of speech samples and scores further comprises: recording the plurality of speech samples from a plurality of speech sources including text-to-speech engines and human beings based on a same set of training text; and rating each of the plurality of speech samples to assign the score thereto.

Figure 2:
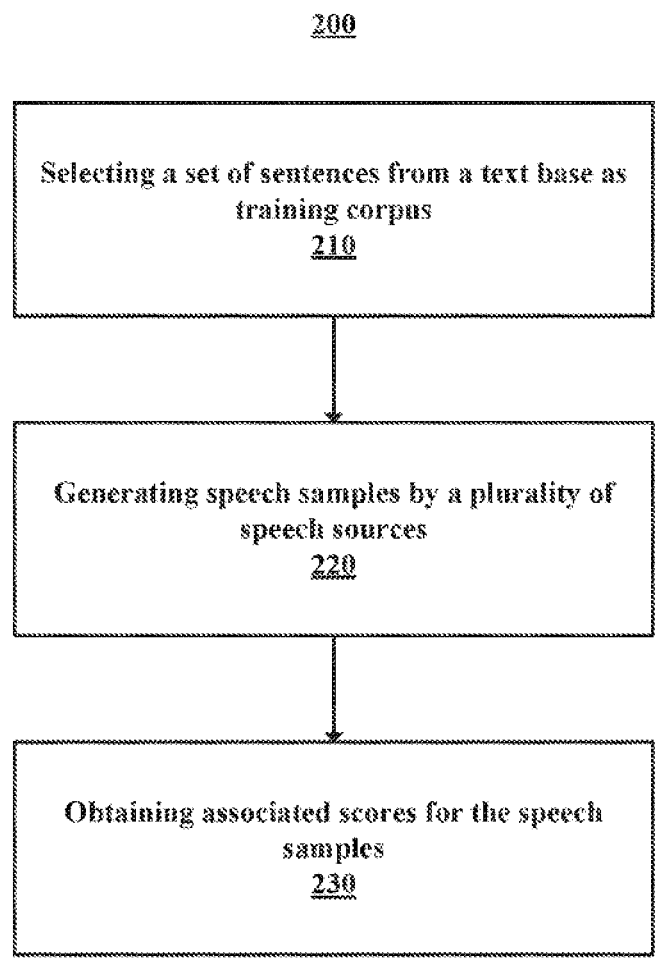
FIG. 2 illustrates a flow chart showing a method for preparing a plurality of speech samples and associated scores in accordance with an exemplary embodiment of the present invention.

FIG. 2 is a flow chart illustrating a process for preparing a plurality of speech samples and associated scores in accordance with an exemplary embodiment of the present invention.

As shown at step 210, a set of sentences are selected from a text base as training corpus. For example, the set of sentences may involve sufficient phonetic phenomena such as syllables, syllable links, tone sandhi, light tones, polyphones. Meanwhile, the topics of these sentences are from navigation, weather, temperature, POI names, short messages, music name, and so on. In a concrete example, 720 sentences are selected as training corpus.

Next, as shown at step 220, speech samples are generated by a plurality of speech sources. In an example, the plurality of speech sources may include TTS engines and human beings.

In a concrete example, for a better coverage, 10 different TTS engines are selected from China market and 6 human beings are selected, then a total of 720*16=11520 speech samples can be obtained. The TTS engines may include but not limited to the nuance, iflytek, microsoft, sinovoice and their different versions. Regarding speech samples provided by human beings, on one hand, these speech samples can provide criteria of human speech, which will help to evaluate TTS systems more objectively, and on the other hand, these speech samples could added in following model training to increase the coverage rate of different quality of speech samples.

Next, as shown at step 230, associated scores for the speech samples are obtained. In this example, MOS scores are selected as the associated scores of speech samples. It should be noted that other scores can be used instead.

In a concrete example, there are 160 listeners, each of them handles 720 speech samples from 16 systems, and each speech sample is assessed by 10 people.

At the end of the process 200, a plurality of speech samples and scores associated with the respective speech samples are provided.

Then, as shown at step 120, acoustic features that influence the associated scores of the respective speech samples may be extracted from the respective speech samples.

In an example, acoustic features that influence the associated scores of the respective speech samples may be extracted by: extracting a set of acoustic features from the respective speech samples; and selecting the acoustic features that influence the associated scores of the respective speech samples from the set of acoustic features according to relevancy between each acoustic feature in the extracted set of acoustic features and the associated scores of the respective speech samples.

According to previous studies on acoustic features, a large number of acoustic features are used in processing of natural speeches. In an example, 1582 acoustic features (which can be regarded as a 1582-dimensionality feature set) can be found in Florian Hinterleitner, Georgina Neitzel, Sebastian Moller, and Christoph Norrenbrock, "An evaluation protocol for the subjective assessment of text-to-speech in audiobook reading tasks," in Proceedings of the Blizzard challenge workshop, Florence, Italy. Citeseer, 2011." The acoustic features may comprise pitch, volume, tremble, frequency spectrum, Mel-scale filter bank related features plus with some other features, and functions of their mean value, variance, etc.

It should be noted that there has already been a lot of research on how to extract acoustic features from the speech samples for natural language processing, and these feature extraction approaches can be directly used in embodiments of the present invention and are not detailed herein.

After extracting a set of acoustic features from the respective speech samples, the acoustic features that influence the associated scores of the respective speech samples from the set of acoustic features may be selected according to relevancy between each acoustic feature in the extracted set of acoustic features and the associated scores of the respective speech samples.

In an example, the acoustic features that influence the associated scores of the respective speech samples may be selected by: calculating the relevancy between each feature of the 1582-dimensionality set and associated scores (e.g., MOS scores); selecting the highest N-dimensionality (N is from 100 to 1582) acoustic features as an extraction result and inputting them to a Support Vector Regression (SVR) model for testing. Experiments show that a 600-dimensionality feature set is more distinctive.

For example, a 1582-dimensionality features (named features 1582) can be extracted by using OpenSmileToolkit (which can be found in I. Guyon and A. Elisseeff, "An introduction to variable and feature selection," J. Mach. Learn. Res., vol. 3, pp. 1157-1182, Mar. 2003 [Online]. Available: http://dl.acm.org/citation.cfm?id=944919.944968), and then an SVR model can be trained to predict the quality scores of speech utterances. Next, a more distinctive 600-dimensionality feature set (named features 600) can be selected.

In an example of the present embodiment, selecting the acoustic features that influence the associated scores of the respective speech samples from the set of extracted acoustic features may further comprise: applying a sub-space decomposition method to the selected acoustic features. In an example of the present embodiment, applying the sub-space decomposition method comprises applying a Linear Discriminant Analysis (LDA).

In particular, as different acoustic features have different weights to the final quality, or have nothing to do with it, the quality related information which is meaningful for TTS evaluation is only a small part of the synthesized speech signal. So further selecting the acoustic features that are related with the quality of speech are import. Herein, a subspace decomposition method can be used to further select the quality related acoustic features, i.e., selecting the acoustic features that influence the associated scores of the respective speech samples. For example, a sub-space decomposition method may be applied to the selected acoustic features (e.g., 600-dimensionality feature set) to further select the acoustic features.

Assuming the speech signal y consists of our types of information, the quality related information is generated from the quality coefficient matrix Q, the timbre related information is imported through a timbre coefficient matrix S, and the text related information can be represented by a text coefficient matrix T, and the additive noise e. The observation model of the speech signal will be as below:

$$y = Q\theta + S\alpha + T\beta + e \quad (1)$$

By projection methods, such as Linear Discriminant Analysis (LDA), the 600-dimension features can be transferred to 74 dimension.

Although the above discusses a concrete method of extracting acoustic features that influence the associated scores of the respective speech samples, i.e., extracting a large number of acoustic features and selecting the acoustic features that influence the associated scores of the respective speech from the extracted features, it should be noted that extracting the acoustic features that influence the associated scores of the respective speech directly from the speech samples are also within the scope of the present invention as long as the information regarding which acoustic features that influence the associated scores of the respective speech are available.

Then at step 130, a machine learning model is trained by the acoustic features and corresponding scores. In an example of the present embodiment, the machine learning model may comprise one of a vector support regression (SVR) model, a Deep Neural Networks (DNN) model, and a ListNet model.

It should be noted that there has already been a lot of research on how to train the support vector regression (SVR) model, the Deep Neural Networks (DNN) model, and the ListNet model in a regression case, and the descriptions thereof are omitted here.

In an example of the present embodiment, the machine learning model may be a pairwise support vector machine (SVM) model, and training the machine learning model by the acoustic features and corresponding scores comprises: combining a vector representing the acoustic features of a first speech sample and a vector representing the acoustic features of a second speech sample, wherein the first speech sample and the second speech sample are samples with the same textual content but from different speech sources; and training a SVM model with the combined vector and a label representing the relative size of the associated score of the first speech sample and the second speech sample.

In an example of the present embodiment, if the associated score of the first speech sample is larger than that of the second speech sample, the label is set to 1, otherwise, the label is set to 0.

In an example of the present embodiment, combining a vector representing the acoustic features of a first speech sample and a vector representing the acoustic features of a second speech sample comprises: joining the vector representing the acoustic features of the first speech sample and the vector representing the acoustic features of the second speech sample.

In an example of the present embodiment, combining a vector representing the acoustic features of a first speech sample and a vector representing the acoustic features of a second speech sample comprises: subtracting the vector representing the acoustic features of the second speech sample from the vector representing the acoustic features of the first speech sample.

In this example, a pairwise SVM model is selected mainly for the following reason. The corresponding scores and the acoustic features have a weak relationship, which means it is a weak-label task. For example, in a first case, all duration of an audio sample are better, expect a very small segment has noise, the corresponding score (e.g., MOS score) maybe low; and in a second case, different listeners give different score range to same samples, for example, the mean score of listener A is 3.5, and B is 4. So compared with using the scores directly, it may be better to use relative differences of scores (i.e., which one is better), and select a pairwise based model. The pairwise based model can be found in Florian Eyben, Anton Batliner, and Bjoern Schuller, "Towards a standard set of acoustic features for the processing of emotion in speech" in Proceedings of Meetings on Acoustics. Acoustical Society of America, 2012, Vol. 9, p. 060006.

Figure 3:
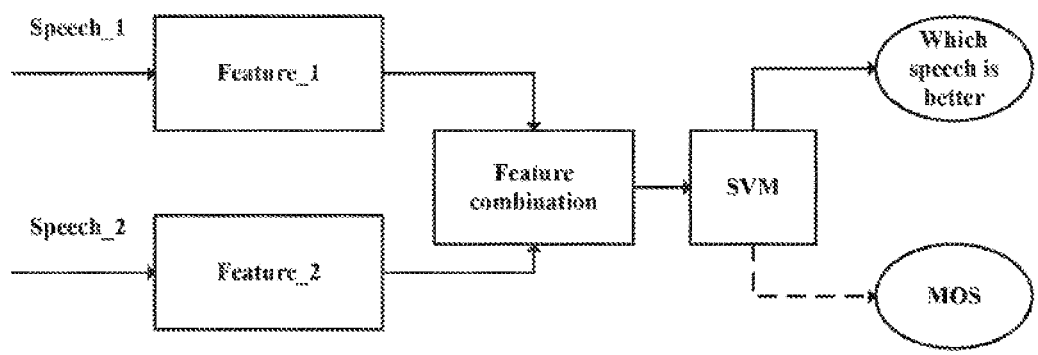
FIG. 3 illustrates a pairwise SVM model constructed to implement the method for performance evaluation of text-to-speech in accordance with an exemplary embodiment of the present invention.

FIG. 3 illustrates a pairwise SVM model constructed to implement the method for performance evaluation of text-to-speech in accordance with an exemplary embodiment of the present invention.

As mentioned before, speech samples are generated from 16 different sources (including 10 different TTS systems and 6 human beings) and 720 different sentences. For 16 speech samples generated from different sources but for the same textual sentence, all combinations of pairs can be get, which is 16*15=240 in total. This procedure can be done to all the 720 sentences, and finally a total of 172,800 speech pairs can be obtained, which can be used as training corpus.

In the feature combine step, there are two methods that can be used. The difference method means that the difference of acoustic features of two input utterances (i.e., speech samples), which can be shown as $\theta=\theta_1-\theta_2$, is used as the input features of a SVM model; the combination method means that two input utterances joined, which can be shown as $\theta=[\theta_1; \theta_2]$ is as the input features of the SVM model, wherein is $\theta_1$ a vector representing the acoustic features of a first speech sample, and $\theta_2$ is a vector representing the acoustic features of a second speech sample.

To improve the credibility of labels, the label for training the machine learning model is defined to be 1 if the former speech is better than the latter one (i.e., the score of the former speech is larger than that of the latter one), and 0 if the former speech is worse than the latter one (i.e., the score of the former speech is smaller than that of the latter one).

In a training stage, two speech samples generated from different sources but for the same textual sentence (i.e., a pair of speech samples) are inputted, and the pairwise SVM model is trained by the speech samples.

In an example, the database being used consists of 11,520 utterances generated from 10 TTS systems and 6 persons using 720 text sentences, and a round-robin test is designed as the out-of-set test. At the training stage, each time, one system is selected as the out-of-set system. The other 15 systems are used for training the model. In a testing stage, the trained model is used to test all of the 16 systems.

In the testing stage, as shown in FIG. 3, the output indicating which of the input speech samples is better is outputted. Using a straightforward score squeezing method, the associated score (e.g., MOS score) of each input speech sample can be obtained from the scores of given speech samples and the output. For example, for a specific speech sample, after testing, the rank of the specific speech sample can be used to estimate the score of the specific speech sample. Based on scores of speech samples, the score of a specific TTS engine as well as rank of the specific TTS engine can be obtained.

The performance of the TTS performance evaluation method 100 can be evaluated by two evaluation indexes: relevancy of system scores C and relevancy of system ranks R:

[Math. 0001]
$$C = \frac{\text{Cov}(\text{predict}_i, y_i)}{|\text{predict}_i| * |y_i|} \quad (2)$$

[Math. 0002]
$$R = \frac{\text{Cov}(\overline{\text{predict}_i}, r_i)}{|\overline{\text{predict}_i}| * |r_i|} \quad (3)$$

wherein $\text{predict}_i$ and $\overline{\text{predict}_i}$ are the score and the rank of the ith TTS system given by the above method 100, and $y_i$ and $r_i$ are the score (e.g., MOS score in this example) and the rank of the TTS system itself after rating. The larger both C and R are, the better the performance is.

After testing a SVR model, the pairwise SVM model as shown in FIG. 3, a DNN model, a ListNet model with raw 1582, 600, projected 74 dimension features, for the close set testing, it is proved that the pairwise SVM model with projected 74 dimension features shows the best performance.

At step 140, a text-to-speech engine is evaluated by the trained machine learning model.

In an example of the present embodiment, evaluating the text-to-speech engine further comprises: providing a set of test text to the text-to-speech engine under evaluation; receiving speeches converted by the text-to-speech engine under evaluation from the set of test text; and computing a score for each piece of speeches based on the trained machine learning model.

Figure 4:
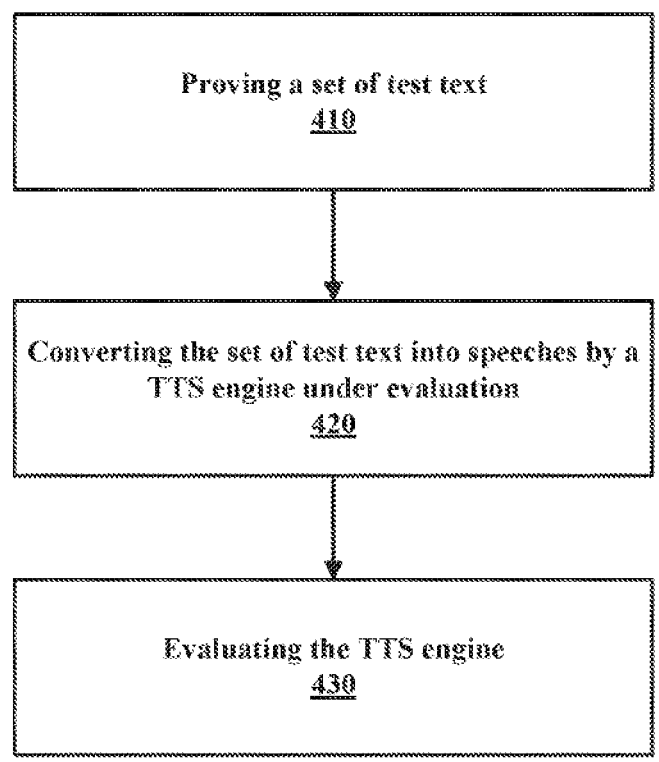
FIG. 4 illustrates a flow chart showing a TTS performance evaluation process in accordance with an exemplary embodiment of the present invention.

FIG. 4 shows an exemplary evaluation procedure 400. Firstly, a set of test text is prepared at step 410. Similar to the set of sentences provided previously at step 210, the test set may also include a set of sentences are selected from a text base as training corpus. For example, the set of sentences may involve sufficient phonetic phenomena such as syllables, syllable links, tone sandhi, light tones, polyphones. Meanwhile, the topics of these sentences are from navigation, weather, temperature, POI names, short messages, music name, and so on. The test set may be the same as the training set provided previously at step 210.

The TTS engine under evaluation then converts at step 420 the set of test text into test speeches, which may be recorded automatically and stored in a non-transitory storage medium. Based on the trained machine learning model, such test speeches may be used to evaluate the corresponding TTS engine.

Before evaluation with the test speeches, the test speeches should also be subjected to feature extraction procedures. The feature extraction procedures may be the same as those discussed relative to step 120, and a repetitive description thereof will be omitted herein.

Then, the test speeches (more exactly, the extracted features) may be used to evaluate at step 430 the TTS engine by the trained machine learning model. In particular, the trained machine learning model is used to score each test speech. The step is repeated for the set of test text and all the scores are aggregated, representing the evaluation result for the TTS engine.

The method for text-to-speech performance evaluation in accordance with exemplary embodiments of the present invention has been disclosed as above. The embodiments evaluate the TTS system objectively and investigate different features and machine learning method.

Compared with subject evaluation methods, which needs a lot of participants in order to get a credible evaluation result from the statistical perspective for a new different TTS synthesis engines, the present evaluation method can be repetitively used for test and evaluation of different TTS synthesis engines. The proposed solution in this invention largely decreases the required time and labor cost.

Compared with other objective evaluation methods, the present evaluation method adds natural speech as a reference, and acoustic features that have important role for the final quality (that is, acoustic features influence the associated scores of the respective speech samples) to train a machine learning model, and then uses the trained acoustic features model to evaluate a TTS engine. The proposed solution in this invention provides an evaluation method which is more efficient.

Figure 5:
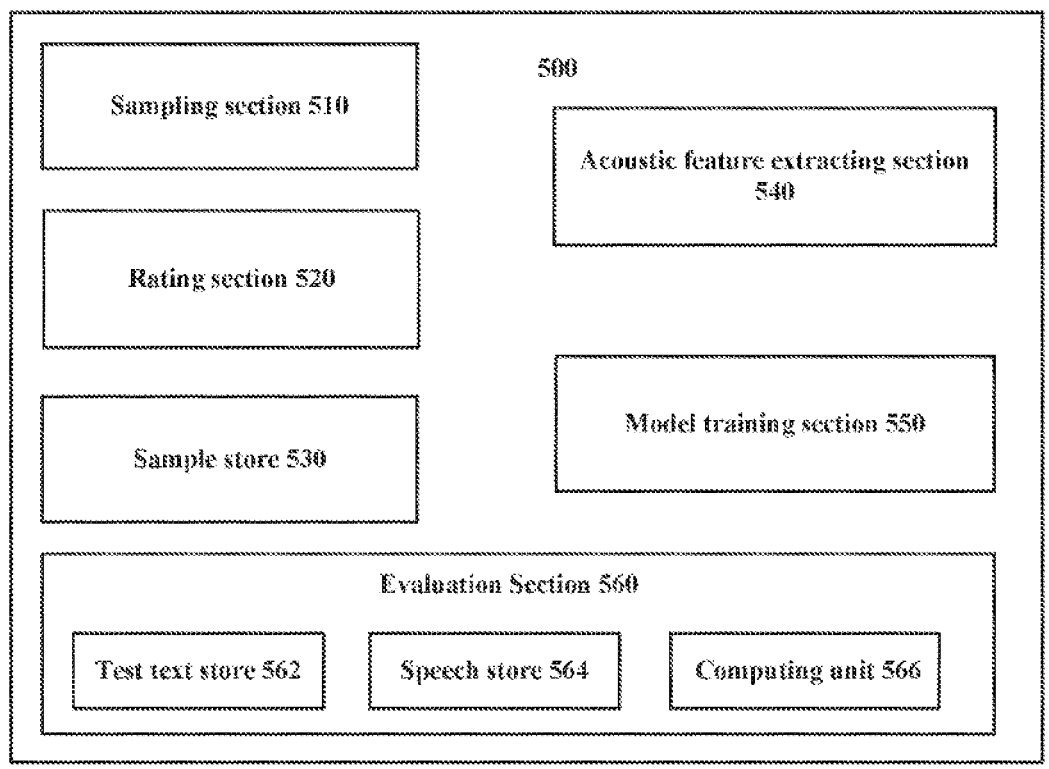
FIG. 5 illustrates a block diagram of a system for TTS performance evaluation in accordance with an exemplary embodiment of the present invention.

FIG. 5 illustrates a block diagram showing a system 500 for TTS performance evaluation in accordance with an exemplary embodiment of the present invention. The blocks of the system 500 may be implemented by hardware, software, firmware, or any combination thereof to carry out the principles of the present invention. It is understood by those skilled in the art that the blocks described in FIG. 5 may be combined or separated into sub-blocks to implement the principles of the invention as described above. Therefore, the description herein may support any possible combination or separation or further definition of the blocks described herein.

Further, since operations of some components of the system 500 may become apparent with reference to the methods discussed in relation to FIGS. 1-4, the system 500 will be described briefly hereinafter.

Referring to FIG. 5, the system 500 may include a sampling section 510 and a rating section 520. The sampling section 510 may be configured to record a plurality of speech samples from a plurality of speech sources based on a same set of training text. The speech sources may include a plurality of TTS engines and human beings with different dialects and different clarity of pronunciation. The sampling section 510 may be implemented as sound recording equipment such as a microphone and/or software such as a sound recording program that record readouts from the speech sources. In other embodiments, the sampling section 510 may be implemented to directly receive speech samples outputted from the plurality of TTS engines. The speech samples generated by the sampling section 510 may be stored in a sample store 530.

The rating section 520 may be configured to rate each of the set of speech samples so as to assign at least a score to each sample. The rating section 520 may be configured to implement a Mean Opinion Score (MOS) test, a Diagnostic Acceptability Measure (DAM) test, Comprehension Test (CT), or the like. The rating section 520 may distribute the plurality of speech samples via network to a plurality of listeners including volunteers and/or part-time workers and collect corresponding scores via network from the plurality of volunteers and/or part-time workers. In some embodiments, each of the plurality of speech sample may have a weight. For example, a simple speech may have a lower weight, while a complex speech may have a higher weight. The rating section 520 may further multiply the score assigned by the listeners by the corresponding weight and output the product as a rating score.

The scores from the rating section 520 may also be stored in the sample store 530 along with the speech samples from the sampling section 510. The sample store 530 may be implemented as a non-transitory storage medium such as a flash memory, a hard disk drive (HDD), an optical disk and the like. The speech samples and corresponding scores may be provided from the sample store 530 to an acoustic feature extracting section 540 and a model training section 550 respectively, where acoustic features that influence the associated scores of the respective speech samples are extracted from the respective speech samples and a machine learning model are trained by the acoustic features and corresponding scores, respectively. The sample store 530 may be implemented as a local storage near by the acoustic feature extracting section 540 and the model training section 550, or as a remote storage far away from the acoustic feature extracting section 540 and the model training section 550. In the latter case, the samples and scores may be transmitted, for example, via network to the acoustic feature extracting section 540 and the model training section 550.

More specifically, the acoustic feature extracting section 540 may be configured to extract acoustic features that influence the associated scores of the respective speech samples are extracted from the respective speech samples.

Moreover, the model training section 550 may be configured to train a machine learning model by the acoustic features and corresponding scores.

The system 500 may further include an evaluation section 560 configured to evaluate a TTS engine by the trained machine learning model.

The evaluation section 560 may include a test text store 562, a speech store 564 and a computing unit 566. The test text store 562 may contain a set of test text to be provided to the TTS engine under evaluation. The speech store 564 may receive speeches converted by the TTS engine under evaluation from the set of test text. Then, the computing unit 566 may compute a score or a weighted score by using the speech model from the machine learning unit 566 based on the test speeches. The scores or the weighted scores for each test speech may be summed up in the computing unit 566, representing the evaluation result for the TTS engine.

Another aspect of the present invention may involve a vehicle equipped with a system for text-to-speech performance evaluation in accordance with an exemplary embodiment of the present invention.

Herein, operations of some components of the system included in the vehicle may become apparent with reference to the system discussed in relation to FIG. 5 and the method discussed in relation to FIGS. 1-4, the system included in the vehicle will be described briefly hereinafter.

The system may comprise a sample store containing a plurality of speech samples and scores associated with the respective speech samples; an acoustic feature extracting section configured to extract acoustic features that influence the associated scores of the respective speech samples from the respective speech samples; a model training section configured to train a machine learning model by the acoustic features and corresponding scores; and an evaluating section configured to evaluate a TTS engine by the trained machine learning model.

In an example of the present embodiment, the machine learning model is a pairwise support vector machine (SVM) model, and to train the machine learning model by the acoustic features and corresponding scores, the model training section is configured to: combine a vector representing the acoustic features of a first speech sample and a vector representing the acoustic features of a second speech sample, wherein the first speech sample and the second speech sample are samples with the same textual content but from different speech sources; and train a SVM model with the combined vector and a label representing the relative size of the associated score of the first speech sample and the second speech sample.

Those skilled in the art may clearly know from the above embodiments that the present invention may be implemented by software with necessary hardware, or by hardware, firmware and the like. Based on such understanding, the embodiments of the present invention may be embodied in part in a software form. The computer software may be stored in a readable storage medium such as a floppy disk, a hard disk, an optical disk or a flash memory of the computer. The computer software comprises a series of instructions to make the computer (e.g., a personal computer, a service station or a network terminal) execute the method or a part thereof according to respective embodiment of the present invention.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for text-to-speech performance evaluation, comprising:
   providing a plurality of speech samples and scores associated with respective speech samples;
   extracting acoustic features that influence the associated scores of the respective speech samples from the respective speech samples;
   training a machine learning model by the acoustic features and corresponding scores; and
   evaluating a text-to-speech engine by the trained machine learning model;
   wherein the machine learning model is a pairwise support vector machine (SVM) model, and training the machine learning model by the acoustic features and corresponding scores comprises:
   combining a vector representing the acoustic features of a first speech sample and a vector representing the acoustic features of a second speech sample, wherein the first speech sample and the second speech sample are samples with the same textual content but from different speech sources; and
   training the SVM model with the combined vector and a label representing the relative size of the associated score of the first speech sample and the second speech sample.

2. The method according to claim 1, wherein extracting acoustic features that influence the associated scores of the respective speech samples from the respective speech samples comprises:
   extracting a set of acoustic features from the respective speech samples; and
   selecting the acoustic features that influence the associated scores of the respective speech samples from the set of acoustic features according to relevancy between each acoustic feature in the extracted set of acoustic features and the associated score of the respective speech sample.

3. The method according to claim 2, wherein selecting the acoustic features that influence the associated scores of the respective speech samples from the set of extracted acoustic features further comprises: applying a sub-space decomposition method to the selected acoustic features.

4. The method according to claim 3, wherein applying the sub-space decomposition method comprises applying a Linear Discriminant Analysis (LDA).

5. The method according to claim 1, wherein the machine learning model comprises one of a vector support regression (SVR) model, a Deep Neural Networks (DNN) model, and a ListNet model.

6. The method according to claim 1, wherein if the associated score of the first speech sample is larger than that of the second speech sample, the label is set to 1, otherwise, the label is set to 0.

7. The method according to claim 1, wherein combining a vector representing the acoustic features of a first speech sample and a vector representing the acoustic features of a second speech sample comprises one of:
   joining the vector representing the acoustic features of the first speech sample and the vector representing the acoustic features of the second speech sample; or
   subtracting the vector representing the acoustic features of the second speech sample from the vector representing the acoustic features of the first speech sample.

8. The method according to claim 1, wherein providing the plurality of speech samples and scores further comprises:
   recording the plurality of speech samples from a plurality of speech sources including text-to-speech engines and human beings based on a same set of training text; and
   rating each of the plurality of speech samples to assign the score thereto.

9. The method according to claim 1, wherein evaluating the text-to-speech engine further comprises:
   providing a set of test texts to the text-to-speech engine under evaluation;
   receiving speeches converted by the text-to-speech engine under evaluation from the set of test texts; and
   computing a score for each piece of speeches based on the trained machine learning model.

10. A system for text-to-speech performance evaluation, comprising:
    a sample store containing a plurality of speech samples and scores associated with respective speech samples;
    an acoustic feature extracting section configured to extract acoustic features that influence the associated scores of the respective speech samples from the respective speech samples;
    a model training section configured to train a machine learning model by the acoustic features and corresponding scores; and
    an evaluating section configured to evaluate a text-to-speech engine by the trained machine learning model;
    wherein the machine learning model is a pairwise support vector machine (SVM) model, and to train the machine learning model by the acoustic features and corresponding scores, the model training section is configured to:
    combine a vector representing the acoustic features of a first speech sample and a vector representing the acoustic features of a second speech sample, wherein the first speech sample and the second speech sample are samples with the same textual content but from different speech sources; and
    train the SVM model with the combined vector and a label representing the relative size of the associated score of the first speech sample and the second speech sample.

11. The system according to claim 10, wherein to extract acoustic features that influence the associated scores of the respective speech samples from the respective speech samples, the acoustic feature extracting section is configured to:
- extract a set of acoustic features from the respective speech samples; and
- select the acoustic features that influence the associated scores of the respective speech samples from the set of acoustic features according to relevancy between each acoustic feature in the extracted set of acoustic features and the associated score of the respective speech sample.

12. The system according to claim 11, wherein to select the acoustic features that influence the associated scores of the respective speech samples from the set of extracted acoustic features, the acoustic feature extracting section is further configured to apply a sub-space decomposition method to the selected acoustic features.

13. The system according to claim 12, wherein apply the sub-space decomposition method comprises applying a Linear Discriminant Analysis (LDA).

14. The system according to claim 10, wherein if the associated score of the first speech sample is larger than that of the second speech sample, the label is set to 1, otherwise, the label is set to 0.

15. The system according to claim 10, wherein to combine a vector representing the acoustic features of a first speech sample and a vector representing the acoustic features of a second speech sample, the model training section is configured to implement one of:
- join the vector representing the acoustic features of the first speech sample and the vector representing the acoustic features of the second speech sample; or
- subtract the vector representing the acoustic features of the second speech sample from the vector representing the acoustic features of the first speech sample.

16. The system according to claim 10, wherein the evaluation section further comprises:
- a test text store configured to provide a set of test texts to the text-to-speech engine under evaluation;
- a speech store configured to receive speeches converted by the text-to-speech engine under evaluation from the set of test texts; and
- a computing unit configured to compute a score for each piece of speeches based on the trained machine learning model.

17. A vehicle equipped with a system for text-to-speech performance evaluation, the system comprising:
- a sample store containing a plurality of speech samples and scores associated with respective speech samples;
- an acoustic feature extracting section configured to extract acoustic features that influence the associated scores of the respective speech samples from the respective speech samples;
- a model training section configured to train a machine learning model by the acoustic features and corresponding scores; and
- an evaluating section configured to evaluate a text-to-speech engine by the trained machine learning model;
- wherein the machine learning model is a pairwise support vector machine (SVM) model, and to train the machine learning model by the acoustic features and corresponding scores, the model training section is configured to:
- combine a vector representing the acoustic features of a first speech sample and a vector representing the acoustic features of a second speech sample, wherein the first speech sample and the second speech sample are samples with the same textual content but from different speech sources; and
- train the SVM model with the combined vector and a label representing the relative size of the associated score of the first speech sample and the second speech sample.

* * * * *